United States Patent
Poodt et al.

(10) Patent No.: US 11,108,031 B2
(45) Date of Patent: Aug. 31, 2021

(54) HYBRID NANOLAMINATE ELECTRODES FOR LI-ION BATTERIES

(71) Applicant: Nederlandse Organisatie voor toegepast-natuurwetenschappelijk onderzoek TNO, The Hague (NL)

(72) Inventors: Paulus Willibrordus George Poodt, Deest (NL); Sandeep Unnikrishnan, Veldhoven (NL); Philippe Vereecken, Luik (BE); Sebastien Paul Norbert Moitzheim, The Hague (NL); Antonius Maria Bernardus van Mol, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 197 days.

(21) Appl. No.: 16/463,495

(22) PCT Filed: Nov. 27, 2017

(86) PCT No.: PCT/NL2017/050782
§ 371 (c)(1),
(2) Date: May 23, 2019

(87) PCT Pub. No.: WO2018/097727
PCT Pub. Date: May 31, 2018

(65) Prior Publication Data
US 2019/0363337 A1  Nov. 28, 2019

(30) Foreign Application Priority Data
Nov. 25, 2016  (EP) .................... 16200799

(51) Int. Cl.
*H01M 4/02* (2006.01)
*H01M 4/04* (2006.01)
(Continued)

(52) U.S. Cl.
CPC ....... *H01M 4/0402* (2013.01); *H01M 10/056* (2013.01); *H01M 10/058* (2013.01); *H01M 10/0525* (2013.01)

(58) Field of Classification Search
CPC ....................................... H01M 4/02
See application file for complete search history.

(56) References Cited

U.S. PATENT DOCUMENTS

2008/0057386 A1   3/2008 Visco et al.
2011/0272786 A1*  11/2011 Besling .............. H01M 10/058
                                                    257/534
(Continued)

FOREIGN PATENT DOCUMENTS

FR  3016258 A1   7/2015
JP  2010-067508  3/2010
(Continued)

OTHER PUBLICATIONS

Kerckhove et al, "Molecular Layer Deposition of "titanicone", a Titanium-Based Hybrid Material, as an Electrode for Lithium-Ion Batteries," Dalton Transactions, The International Journal for Inorganic, Organometallic and Bioinorganic Chemistry, Impact Factor 4.177, Issue 3, 2016 (3 pages) http://pubs.rsc.org/en/content/articlelanding/2016/dt/c5dt03840e.
(Continued)

*Primary Examiner* — Jacob B Marks
(74) *Attorney, Agent, or Firm* — Leydig, Voit & Mayer, Ltd.

(57) ABSTRACT

An electrode for a Lithium battery, comprising: a multi-dyad nanolaminate stack formed of a metal oxide layer of the group $TiO_2$, $MnO_2$ or combinations thereof, ranging between 0.3 and 300 nm; separated by a decoupling layer.

20 Claims, 2 Drawing Sheets

(51) Int. Cl.
*H01M 10/0525* (2010.01)
*H01M 10/056* (2010.01)
*H01M 10/058* (2010.01)

(56) References Cited

U.S. PATENT DOCUMENTS

2014/0087227 A1* 3/2014 Shih .................. H01M 10/0562
429/99
2014/0363744 A1 12/2014 Vereecken et al.
2015/0159271 A1 6/2015 Lee et al.

FOREIGN PATENT DOCUMENTS

WO  WO 2010/032159 A1  3/2010
WO  WO 2010/041161 A1  4/2010

OTHER PUBLICATIONS

Travis et al., "Pyrolysis of Titanicone Molecular Layer Deposition Films as Precursors for Conducting $TiO_2$ / Carbon Composite Films," The Journal of Physical Chemistry C, 117, pp. 17442-17450 (2013).
European Patent Office, International Search Report in corresponding International Application No. PCT/NL2017/060782, dated Jan. 23, 2018 (2 pages).

* cited by examiner

HYBRID NANOLAMINATE ELECTRODES FOR LI-ION BATTERIES

CROSS-REFERENCE TO RELATED APPLICATIONS

This patent application is a U.S. National Phase of PCT International Application No. PCT/NL2017/050782, filed Nov. 27, 2017, which claims priority to European Application No, 16200799.1, filed Nov. 25, 2016, which are both expressly incorporated by reference in their entireties, including any references contained therein.

FIELD

The invention further relates to an electronic device comprising an electronic circuit equipped with an electrode of a type such as electrochemical devices. In particular, the present disclosure relates to ion insertion type batteries and to methods for fabricating ion insertion type batteries, such as for example Li-ion batteries. More in particular, the present disclosure relates to electrodes and electrode layers for ion insertion type batteries and to methods for forming such electrodes and electrode layers. These electrode layers may for example be used as electrodes in thin-film batteries, in particle based batteries, in all-solid-state batteries, or in liquid electrolyte batteries.

BACKGROUND

In electronic devices, electronic circuits may be equipped with current collectors of a type such as in electrochemical devices. For example an electrochemical device is a battery such as a rechargeable Li-ion solid-state battery having current collector of non-planar design. In discharging battery mode, the anode is the "negative electrode" to which the positive current flows, from the cathode, being the "positive electrode". During charge these functions are reversed. Irrespective of the charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode) materials are $Li_4Ti_6O_{12}$ (Titanate); $LiC_6$ (Graphite); $Li4.4Si$ (Silicon) and $Li4.4Ge$ (Germanium) known positive electrode (cathode) materials are $LiCOO_2$ (LCO), $LiCoPO_4$, (doped) $LiMn_2O_4$ (LMO), $LiMnPO_4$, $LiFePO_4$ (LFP), $LiFePO_4F$ (LFPF) or $LiCO1/3Ni1/3Mn1/3O_2$ (LCNMO).

Known (solid state) electrolytes might include lithium iodide (LiI), lithium phosphate ($Li_3PO_4$) and lithium phosphorus oxynitride (LiPON). In addition, lithium salts, such as $LiPF_6$, $LiBF_4$ or $LiClO_4$ in an organic solvent, such as ethylene carbonate, dimethyl carbonate, diethyl carbonate, propylene carbonate are known to have a typical conductivity of about 10 mS/cm at RT. The electrolyte decomposes on initial charging at the negative electrode-electrolyte interface and forms a solid layer called the solid electrolyte interphase (SEI).

Solid polymer separators may also be included, such polymers having transport capacity often due to having a lithium salt disposed therein as known in the state of the art. Work has also been performed with lithium and halide materials, particularly, in some examples, a lithium aluminum tetrahalide such as lithium aluminum tetrafluoride ($LiAlF_4$).

A material that is receiving considerable attention as an electrode for ion insertion type batteries such as lithium-ion batteries is TiOx, since it offers a high theoretical capacity (335 mAh/g or for anatase $TiO_2$ about 1280 mAh/cm3) and offers a potentially cheap, environmentally friendly and stable alternative to the current electrode materials. However, due to its low electronic conductivity and poor Li-ion conductivity it has a poor rate performance, which makes it unsuitable for practical applications. To improve the rate performance methods such as doping, nanostructuring or nanosizing and the use of different TiOx polymorphs are being investigated. Doping of the TiOx material may lead to an improved electronic conductivity of the material and in addition the ion conduction (ion diffusion) may be facilitated. Such positive conductivity effects have been reported for Li-ion diffusion in anatase and spinel TiOx based particles doped with cations and anions. Also a reductive type of doping by H2 has been proposed, giving rise to an enhanced electronic conductivity of anatase TiOx and improved Li-ion storage kinetics, i.e. a higher rate of Li-ion insertion and extraction, with more capacity available at higher charging rates. Such hydrogen doping process is typically done at a temperature above 300° C., such as for example at 450° C., which makes it incompatible with amorphous TiOx. Among the different strategies to improve the rate performance of TiOx, the use of amorphous TiOx instead of crystalline (e.g. anatase) TiOx shows promising results. The creation of nanocomposites based on amorphous TiOx, such as for example an amorphous TiOx/carbon nanocomposite (e.g. carbon-titania/titanate nanocomposite), may lead to improved ion insertion and extraction properties. In general, nanosystems comprising for example nanoparticles, nanotubes or nanosheets, tend to be significantly more expensive than thin-film based systems. Increasing the electrode thickness increases capacity, but decreases charging rates as diffusion/drift lengths increase. In order to achieve an efficient charging of the battery, the volumetric Li-ion storage capacity should maximized so the electrode thickness can be minimized. A need still exists to produce these high aspect ratio structures in a simple and reliable way.

SUMMARY OF THE INVENTION

It is an object of the invention to provide a method for producing an electronic device having an electrode capable of a high specific charge collecting area and power, having a proper dimensioning but is also achieved using a simple and fast technique and resulting in a robust design that may optionally be flexed.

To this end, according to an aspect a method is provided for manufacturing an electrode wherein a hybrid nanolaminate film is manufactured having thin $TiO_2$ films ranging between 0.3 and 300 nm with a high volumetric capacity, sandwiched between an organic decoupling layer. The decoupling layer could be one or several monolayers of conductive organic molecules. A favored form is a stack of a hybrid nanolaminate of 5 nm $TiO_2$ and one monolayer of an ALD deposited titanocone based on aromatic or conjugated molecules. In this setup, conductive hybrid monolayers act as as separation layers in a multi-dyad nanolaminate stack formed of $TiO_2$ nanosheets. Alternatively the layers could be manufactured by sputtering, or chemical deposition techniques.

Accordingly through a precise control of the thickness of both the TiO2 and the hybrid separation layer conductivity and capacity can be maximized at minimized volume/mass of complete stack.

While the concept of hybrid nanolaminates manufactured by ALD techniques is not new per se, this specific structure improves both ionic and electric transport, not provided in the prior art.

In the specification, depending on context, functional layers may not be in direct contact with other functional structures, but may have intermediate layers or structures in between that may enhance functionality. In that respect, the skilled person will understand that where it is described, for example, that the negative electrode layer is 'in contact' with a charge collector, such would be interpreted as 'in electrical contact' not excluding a possible Lithium diffusion barrier layer, current collecting layer, process protection layer etc. enhancing functionality. This similarly counts for electrolyte layers 'in contact' with the negative electrode and positive electrode layers.

DETAILED DESCRIPTION OF THE DRAWINGS

Figure 1A:
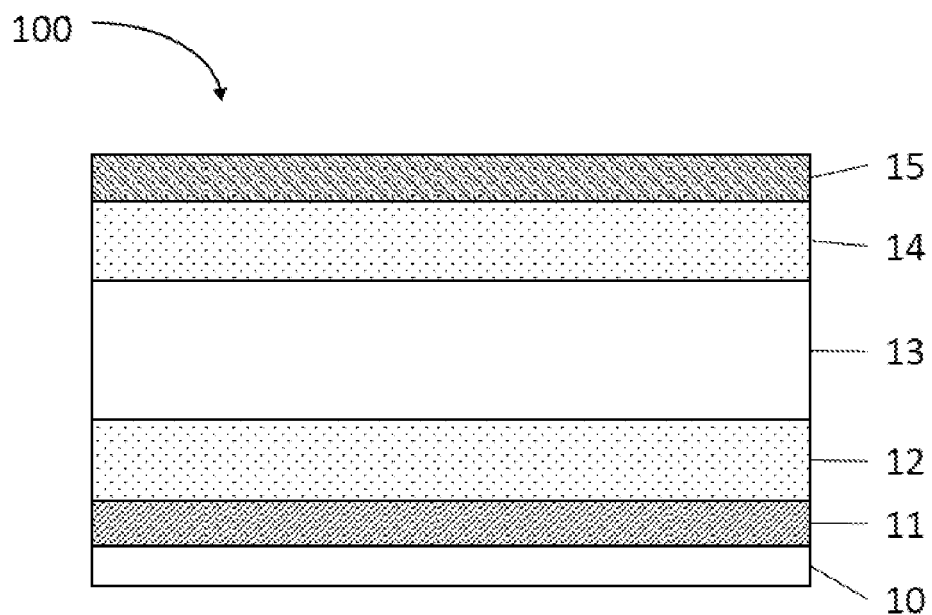
FIG. 1A shows a schematic cross section of a thin-film battery cell.

In their simplest conceptualization, battery devices two electrodes, one that supplies electrons by virtue of an oxidation process occurring at that electrode, termed the anode, and a second one that consumes electrons by virtue of a reduction process occurring at that electrode, termed the cathode. In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode during battery discharge) materials are Li4Ti5O12 (Lithium Titanate spinel or LTO); LiC6 (Graphite); Li4.4Si (Silicon) and Li4.4Ge (Germanium) known positive electrode (cathode) materials are LiCoO2 (Lithium Cobalt oxide or LCO), LiCoPO4, (doped) LiMn2O4 (Lithium manganese oxide spinel or LMO), LiMnPO4, LiFePO4 (LFP), LiFePO4F (LFPF) or LiCO1/3Ni1/3Mn1/3O2 (LCNMO).

Known (solid state) electrolytes might include lithium iodide (LiI), lithium phosphate (Li3PO4) and lithium phosphorus oxynitride (LiPON). In addition, lithium salts, such as LiPF6, LiBF4 or LiClO4 in an organic solvent, such as ethylene carbonate, dimethyl carbonate, diethyl carbonate, propylene carbonate are known to have a typical conductivity of about 10 mS/cm at RT. The electrolyte decomposes on initial charging at the negative electrode-electrolyte interface and forms a solid layer called the solid electrolyte interphase (SEI).

Thin film ion batteries, including those of the thin film solid state lithium ion type, can be prepared from various deposition techniques to fabricate negative electrode, positive electrode, and electrolyte materials bonded together to form the battery. Such techniques may typically include depositing thin films of such materials using vacuum deposition or other techniques that result in similar thin films, to produce the "thin film" batteries. Thin film batteries are often employed in applications in which space and weight may preferably be conserved and extremely long cycle life may be desired.

In the following examples in more detail aspects of the invention will be illustrated in the form of an electrochemical device, more specifically a battery device, for instance of a lithium ion type, more specifically having a collector structure for enhancing the charge collecting specific area of the collector, that is in electrical contact with battery multilayer, in particular, a negative electrode layer thereof.

The disclosure will now be described by a detailed description of several embodiments of the disclosure. It is clear that other embodiments of the disclosure can be configured according to the knowledge of persons skilled in the art without departing from the true spirit or technical teaching of the disclosure, the disclosure being limited only by the terms of the appended claims. In the further description, the present disclosure is mainly described for thin-film solid-state Li-ion batteries, but the present disclosure is not limited thereto. For example, electrode layers and methods according to embodiments of the present disclosure may also be used in the context of particle based batteries and/or in the context of liquid electrolyte batteries. Further, electrode layers and methods according to embodiments of the present disclosure may also be used in other ion insertion type batteries, such as for example Mg-ion, K-ion, Na-ion or Al-ion batteries.

FIG. 1 shows a schematic cross section of a thin-film battery cell 100. It comprises a stack of a first current collector layer 11, a first electrode layer 12, an electrolyte layer 13, a second electrode layer 14 and a second current collector layer 15. This stack may be provided on a substrate 10. The first electrode layer 12 may be a negative electrode layer or anode layer and the second electrode layer 14 may be a positive electrode layer or cathode layer or vice versa, the first electrode layer 12 may be a positive electrode layer or cathode layer and the second electrode layer 14 may be a negative electrode layer or anode layer.

In the further description it is assumed that the first electrode layer 12 is a positive electrode layer and the first current collector layer 11 is a positive current collector layer and it is assumed that the second electrode layer 14 is a negative electrode layer and the second current collector layer 15 is a negative collector layer.

An electrode layer according to embodiments of the present disclosure may advantageously be used as the second (negative) electrode layer 14 in the structure shown in FIG. 1, i.e. it may advantageously be deposited after having deposited a first (positive) current collector layer 11, a first (positive) electrode layer 12 and an electrolyte layer 13 on the substrate 10. As further described, an electrode layer according to embodiments of the present disclosure may advantageously be an amorphous layer.

The substrate 10 may for example comprise a semiconductor material such a group IV semiconductor material, e.g. silicon, a metal (e.g metal foil), a carbon nanosheet, a plastic foil or a ceramic material such as a silicate. In the example shown in FIG. 1, the substrate 10 is a planar substrate. However, the substrate 10 may also be a non-planar substrate, e.g. comprising a plurality of 3D features or 3D microstructures, such as for example a plurality of micropillars, a plurality of nanowires or a substrate comprising 3D (nano)meshes, nanotubes and/or other porous structures, such as for example porous anodized alumina. The 3D features may be present on the substrate in a regular pattern, such as for example a regular array pattern, or they may be randomly distributed over the substrate. For example, the substrate 10 may comprise an array of high aspect-ratio pillars, such as for example silicon pillars, on which the first collector layer 11 may be coated. The pillars may for example have a diameter in the range between 0.5 micrometer and 10 micrometer, a spacing of 1 micrometer to 20 micrometer and a height in the range between 10 micrometer and 200 micrometer, the present disclosure not being limited thereto. It is an advantage of using a substrate comprising a plurality of 3D microstructures that it results in an increased battery capacity.

The first collector layer 11 may for example be a positive collector layer. The positive collector layer 12 is an electrically conductive layer, such as a metal layer (e.g. comprising Pt, Al, Cu, Ti, W or Au), a conductive polymer layer (e.g. polyaniline), a conductive ceramic layer (e.g. TiN) or a conductive oxide (e.g. RuO2) or carbon layer, the present disclosure not being limited thereto. In embodiments of the present disclosure wherein the substrate 10 is an electrically conductive substrate, the substrate may also function as a first collector layer and there may be no need for providing a dedicated first collector layer 11.

The first electrode layer 12 may for example be a positive electrode layer or a cathode layer. More particularly, layer 12 or 15 is advantageously a multi-dyad nanolaminate stack formed of TiO2 nanosheets ranging between 3 and 300 nm; separated by anorganic decoupling layer. Alternatively MnO2 nanosheets can be used with similar geometries.

The decoupling layer exhibits sufficient electrical conductivity and ionic conductivity in order for Li ions to penetrate in the underlying TiO2 layers. For this purpose, a single monolayer of an organic molecule as interface layer can be used, provided electron tunneling is sufficient for providing the electron conductivity.

The thickness of the individual TiO2 films can be optimized for maximum volumetric capacity, while the entire stack thickness can be optimized (minimized) for overall capacity.

For other ion insertion type batteries, the first electrode layer 12 may for example comprise similar materials as listed above for Li-ion batteries, but with the Li being substituted by the other ion. For example, for Na-ion batteries the first electrode layer 12 may e.g. comprise NaMn2O4; for Mg-ion batteries the first electrode layer may e.g. comprise MgMn2O4; and for Al-ion batteries the first electrode layer may e.g. comprise AlxV2O3, the present disclosure not being limited thereto.

The electrolyte layer 13 may for example comprise a separator (e.g. a microporous separator) soaked in a liquid electrolyte, a gel-polymer electrolyte or a solid-state electrolyte. For embodiments with a liquid electrolyte, the separator can for example comprise a polyolefin material such as a polyethylene or a polypropylene. The liquid electrolyte may comprise a solvent such as for example an organic solvent (e.g. propylene carbonate, dimethyl carbonate) or water. For Li-ion batteries the mobile ions (Li ions) may for example be provided in the liquid electrolyte by dissolving for example lithium hexafluorophosphate or lithium perchlorate in the solvent. For other ion insertion batteries the mobile ions may be provided by using salts soluble towards the specific solvent used.

For example, for Mg-ion batteries Mg(ClO4)2 may be dissolved in propylene carbonate to form the liquid electrolyte. Polymer-gel electrolytes may comprise a polymer host such as for example poly(ethyleneoxide) or poly(propyleneoxide) with a plasticizer and a salt. Solid electrolytes are solid ion conductors and may in case of a Li-ion battery for example comprise an organic material such as e.g. poly(ethyleneoxide)/LiCF3SO3, or an inorganic material such as a Lithium Super Ionic Conductor material (LISICON material, such as e.g. Li14ZnGe4O16), a thio-LISICON material (such as e.g. Li10GeP2S12), a Sodium Super Ionic Conductor material (NASICON material, such as e.g. Li1.3Al0.3Ti1.7(PO4)3), a perovskite material (such as e.g. La0.5Li0.5TiO3), a garnet material (such as e.g. Li7La3Zr2O12) or an amorphous material (such as e.g. LiPON, Li2.88PO3.73N0.14), the present disclosure not being limited thereto.

The separation layer can be made by Molecular Layer Deposition (MLD, and can exist of 1 or a few e.g. up to 100 MLD monolayers ranging from 0.1 and 10 nm or higher e.g. up to 100 nm. The separation layer should be conductive for both electrons and lithium ions, and therefore, the thinner the better. A typical value of electron conductivity is $10^{-6}$-$10^{-9}$ siemens/cm which can be attained by organic molecules having a diol group as for example in benzenediol, heterocyclic aromatic diol, or a diol including a linear conjucated molecule.

The organic precursor for the MLD step has the following requirements: It is a compound with a general description of $X_1$—R—$X_2$; a molecular backbone R with two reactive chemical groups $X_1$ and $X_2$.

$X_1$ and $X_2$ can be the same or can be different. $X_1$ and/or $X_2$ can be a functional group such as an hydroxyl group (—OH), an amine group (—NH$_2$), a carboxylic acid group (—COOH) or a thiol group (—SH). These groups have to be reactive towards the metal precursor already adsorbed on the surface (e.g. $X_1$) as well as the incoming metal precursor in the next ALD/MLD cycle (e.g. $X_2$)

The molecular backbone R should be electrically conductive. So the backbone should be a conjugated molecule, having a system of connected p-orbitals with delocalized electrons in alternating single and multiple bonds. The backbone can be cyclic, linear or mixed.

Examples of molecules include, but are not limited to:
Benezenecliols; X1=X2=—OH, R=benzene
    Also: the same molecules with one or two of the hydroxyl groups replaced by an amine, acid or thiol group
Heterocyclic aromatic diols like furan-diol and pyridine-diol;
    Also: the same molecules with one or two of the hydroxyl groups replaced by an amine, acid or thiol group
Diols of linear conjugated molecules; R=dienes
    Also: the same molecules with one or two of the hydroxyl groups replaced by an amine, acid or thiol group
Combinations of one or more cyclic and/or linear molecule backbones
Several examples of MLD films with molecular precursors that fall within this category have been published.
Hydroquinone (benzene-1,4-diol, X1=X2=OH, R=benzene) has been combined with Diethylzinc to make Zn-Hydroquine films that demonstrated electrical conductivity (ref 2)
The same organic molecule was used in combination with titanium precursors to make Ti-Hydroquinone (ref 3)

4-Aminophenol ($X_1$=NH2, $X_2$=OH, R=benzene) has been combined with Diethylzinc to make Zn-aminophenol films (ref 4)

The same organic molecule was used in combination with titanium precursors to make Ti-Aminophenol (ref 5)

The deposition scheme to obtain a stack containing x ALD layers of TiO2 and y MLD layers of Ti-OP (where OP is an organic precursor) would be n×[(TiCl4+H2O)x+(TiCl4+OP)y], where n corresponds to the number of supercycles required to obtain a high enough total thickness. For example, a 300 nm film with 5 nm TiO2 films and one monolayer Ti-OP would be require n=6, x=50 and and y=1.

Figure 1B:
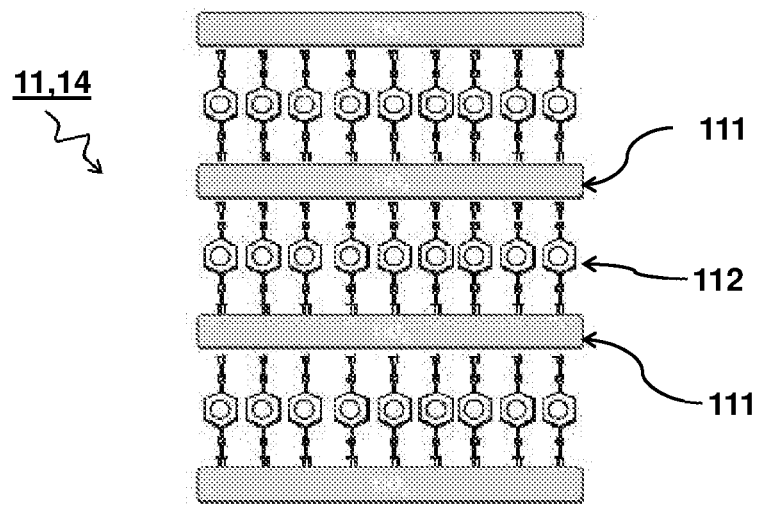
FIG. 1B schematically shows hybrid electrodes.

FIG. 1B schematically shows hybrid electrodes with 5 nm TiO2 nanosheets 111 and 1 monolayer of 4-aminophenol 112, with a total thickness of 200 nm, have been prepared and tested in a coin cell configuration to test the charge-discharge behavior. Though not fully optimized, this stack shows a more than 3 times higher discharge capacity as compared to the pure TiO2 reference. The capacity of the layered stack actually reaches 100% of theoretical capacity based on the Li1TiO2 phase.

Further Embodiments

Figure 2A:
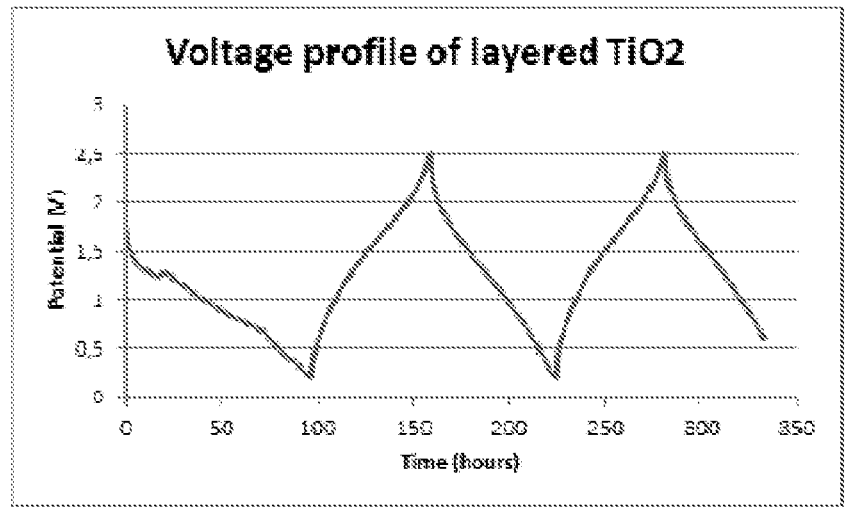
FIG. 2A shows a cycle diagram.

In a further example a combination of an organic molecule (4-aminophenol) and a metal precursor (TiCl4) was used to make the separation layers by a molecular layer deposition process in between atomic layer deposited TiO2 intercalation layers. With this method, hybrid electrodes with 5 nm TiO2 and 1 monolayer of 4-aminophenol, with a total thickness of 200 nm were prepared and tested in a coin cell configuration to test the charge-discharge behavior. FIG. 2A shows a cycle diagram wherein this stack was charged and discharged.

Figure 2B:
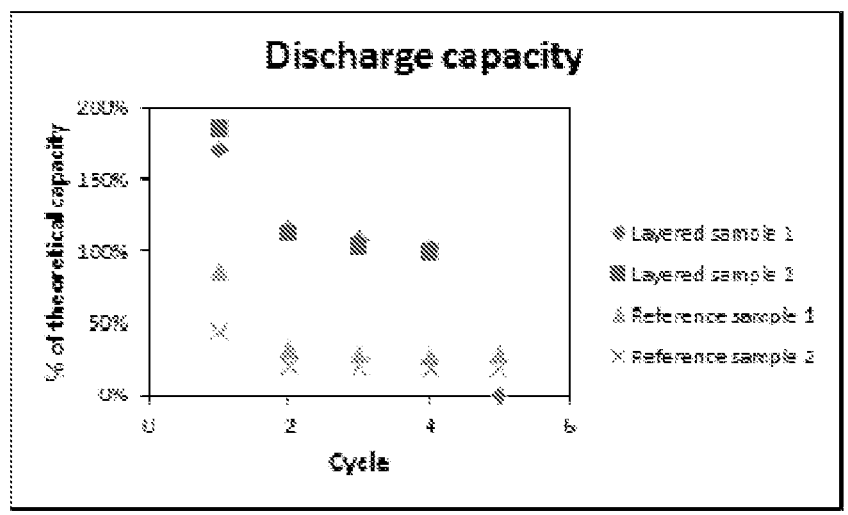
FIG. 2B shows a tested discharge capacity.

FIG. 2B shows a tested discharge capacity of the stack. This stack (layered samples 1 and 2) showed a more than 3 times higher discharge capacity as compared to a pure TiO2 reference electrode layer (reference samples 1 and 2). The increase in capacity caused by the nanosizing effect clearly demonstrates that the separation layers really act as separation layers between individual TiO2 nano-layers. Second, it also demonstrates that the molecular (mono)layers are conductive to electrons and ions, otherwise the electrode would not have functioned.

It is an advantage of methods according to embodiments of the present disclosure that they allow forming thin-film electrode layers with good conformality, i.e. layers having a uniform thickness and exactly following the topography of the underlying substrate. Therefore, a method of the present disclosure may advantageously be used for forming such layers on 3D structures (e.g. in a process for fabricating 3D battery architectures), such as for example on a structure comprising a plurality of high aspect-ratio micro-pillars, high aspect-ratio micro-trenches, a plurality of nanowires, meshes, (nano)porous structures and/or three dimensional scaffolds. Due to the conformal deposition of the layers using an ALD based method according to embodiments of the present disclosure, the thickness of the layers is substantially the same on the 3D structures and in the recesses between such structures as well as on the sides of such structures.

It is an advantage of methods according to embodiments of the present disclosure that they can be easily up-scaled. In advantageous embodiments of the present disclosure, spatial ALD may be used for forming the electrode layers. It is an advantage of spatial ALD as compared to temporal ALD that it allows faster deposition, e.g. a factor of 10 faster deposition, of the electrode layers. This results in a higher fabrication throughput and potentially a lower cost. It will be appreciated that while specific embodiments of the invention have been described above, that the invention may be practiced otherwise than as described. In addition, isolated features discussed with reference to different figures may be combined. In the further description, the present disclosure is mainly described for thin-film solid-state Li-ion batteries, but the present disclosure is not limited thereto. For example, electrode layers and methods according to embodiments of the present disclosure may also be used in the context of particle based batteries and/or in the context of liquid electrolyte batteries. Further, electrode layers and methods according to embodiments of the present disclosure may also be used in other ion insertion type batteries, such as for example Mg-ion, K-ion, Na-ion or Al-ion batteries.

The invention claimed is:

1. An electrode for a Lithium battery, the electrode comprising: a multi-dyad laminate stack formed of multiple ones of a metal oxide layer including one or a combination of metal oxides taken from the group consisting of: TiO2, and MnO2,
    wherein the metal oxide layer has a layer thickness ranging between 0.3 and 300 nm;
    wherein a pair of the multiple ones of the metal oxide layer are separated by a decoupling layer; and
    wherein the decoupling layer is an electroconductive polymer layer having a thickness ranging between 0.1 and 10 nm.

2. The electrode according to claim 1 wherein the decoupling layer is formed by a compound characterized by $X_1$—R—$X_2$; an electroconductive molecular backbone (R) with a group $X_1$ and a group $X_2$, and where $X_1$ and $X_2$ can be identical.

3. The electrode according to claim 2 wherein $X_1$ and $X_2$ are functional groups that are reactive towards a metal precursor adsorbed on a surface of the metal oxide layer of the multi-dyad laminate stack.

4. The electrode according to claim 2, wherein $X_1$ and $X_2$ are each individually chosen from the group consisting of: a hydroxyl (—OH), an amine (—NH$_2$), a carboxylic acid (—COOH), and a thiol (—SH).

5. The electrode according to claim 2, wherein the compound is formed by any one or more of the group consisting of: a Benzenediol, a heterocyclic aromatic diol, and a diol including a linear conjugated backbone.

6. A method of manufacturing an electrode for a Lithium battery, the method comprising the providing a substrate and repeatedly performing the steps of:
    depositing a titanium oxide, manganese oxide, or a mixture thereof in a first deposition stage, to provide a sheet of titanium oxide, manganese oxide, or a mixture thereof, having a thickness ranging between 3 and 300 nm; and
    depositing an electroconductive polymer in a second stage, to provide a monolayer of electroconductive polymer,
    thereby providing a multi-dyad nanolaminate stack formed of nanosheets of titanium oxide, manganese oxide, or a mixture of titanium oxide and manganese oxide.

7. The method according to claim 6, wherein said first deposition stage is an atomic layer deposition (ALD) process wherein a titanium precursor and an oxygen precursor are used.

8. The method according to claim 6, wherein said second deposition stage is a molecular layer deposition (MLD) process wherein an organic precursor is used.

9. The method according to claim 6, wherein said first and second deposition stages are carried out by any one or more of the group consisting of: an atomic layer deposition (ALD) process, a molecular layer deposition (MLD) process, a chemical vapor deposition (CVD) process, and a sputtering process.

10. The method according to claim 6, wherein said first and second deposition stages are carried out in a single run of a deposition tool.

11. The method according to claim 6, wherein said substrate is three-dimensionally structured, having one or more of the group consisting of: a high aspect-ratio micropillars, a high aspect-ratio micro-trenches, a plurality of nanowires, meshes, (nano)porous structures, and three-dimensional scaffolds.

12. An electrode for a Lithium battery, comprising: a multi-dyad laminate stack formed of a metal oxide layer selected from of the group consisting of: $TiO_2$, $MnO_2$, and combinations thereof,
wherein the metal oxide layer has a layer thickness ranging between 0.3 and 300 nm,
wherein a pair of the multiple ones of the metal oxide layer are separated by a decoupling layer, and
wherein the decoupling layer is a single monolayer.

13. The electrode according to claim 12 wherein the decoupling layer is formed by a compound characterized by $X_1$—R—$X_2$; an electroconductive molecular backbone (R) with a group $X_1$ and a group $X_2$, and where $X_1$ and $X_2$ can be identical.

14. The electrode according to claim 13 wherein $X_1$ and $X_2$ are functional groups that are reactive towards a metal precursor adsorbed on a surface of the metal oxide layer of the multi-dyad laminate stack.

15. The electrode according to claim 13, wherein $X_1$ and $X_2$ are each individually chosen from the group consisting of: a hydroxyl (—OH), an amine (—$NH_2$), a carboxylic acid (—COOH), and a thiol (—SH).

16. The electrode according to claim 13, wherein the compound selected from any one or more of the group consisting of: a Benzenediol, a heterocyclic aromatic diol, and a diol including a linear conjugated backbone.

17. An electrode for a Lithium battery, comprising: a multi-dyad laminate stack formed of a metal oxide layer selected from the group consisting of: TiO2, MnO2, and combinations thereof,
wherein the metal oxide layer has a layer thickness ranging between 0.3 and 300 nm,
wherein a pair of the multiple ones of the metal oxide layer are separated by a decoupling layer,
wherein the decoupling layer is formed by a compound characterized by $X_1$—R—$X_2$, an electroconductive molecular backbone (R) with a group $X_1$ and a group $X_2$, and where $X_1$ and $X_2$ can be identical.

18. The electrode according to claim 17 wherein $X_1$ and $X_2$ are functional groups that are reactive towards the metal precursor adsorbed on the surface of the laminate stack.

19. The electrode according to claim 17, wherein $X_1$ and $X_2$ are each individually chosen from the group consisting of: a hydroxyl (—OH), an amine (—$NH_2$), a carboxylic acid (—COOH), and a thiol (—SH).

20. The electrode according to claim 17, wherein the compound is formed by any of the group consisting of: a Benzenediol, a heterocyclic aromatic diol, and a diol including a linear conjugated backbone.

* * * * *